(12) United States Patent
Lvov et al.

(10) Patent No.: US 12,154,032 B2
(45) Date of Patent: Nov. 26, 2024

(54) POST-TRAINING CONTROL OF THE BIAS OF NEURAL NETWORKS

(71) Applicant: DSP Group Ltd., Herzliya (IL)

(72) Inventors: Dmitri Lvov, Ramat Hasharon (IL); Maor Shliefer, Herzliya (IL); Uri Tuval, Herzliya (IL)

(73) Assignee: DSP Group Ltd. (IL)

( * ) Notice: Subject to any disclaimer, the term of this patent is extended or adjusted under 35 U.S.C. 154(b) by 984 days.

(21) Appl. No.: 17/140,279

(22) Filed: Jan. 4, 2021

(65) Prior Publication Data

US 2021/0241101 A1    Aug. 5, 2021

Related U.S. Application Data

(60) Provisional application No. 62/969,790, filed on Feb. 4, 2020.

(51) Int. Cl.
  *G06N 3/08* (2023.01)
  *G06F 18/214* (2023.01)
  *G06F 18/241* (2023.01)
  *G06F 18/2431* (2023.01)

(52) U.S. Cl.
  CPC ............. *G06N 3/08* (2013.01); *G06F 18/214* (2023.01); *G06F 18/241* (2023.01); *G06F 18/2431* (2023.01)

(58) Field of Classification Search
  CPC ................................ G06N 3/08; G06F 18/241
  See application file for complete search history.

(56) References Cited

U.S. PATENT DOCUMENTS

| 5,359,699 | A | * | 10/1994 | Tong | G06F 18/214 |
| | | | | | 706/20 |
| 9,934,567 | B2 | * | 4/2018 | Podilchuk | G06T 7/0012 |
| 2016/0321542 | A1 | * | 11/2016 | Towal | G06N 7/01 |
| 2018/0232601 | A1 | * | 8/2018 | Feng | G06T 7/0004 |
| 2019/0122077 | A1 | * | 4/2019 | Tsishkou | G06N 20/20 |
| 2020/0175265 | A1 | * | 6/2020 | Schön | G06F 18/2431 |
| 2021/0019571 | A1 | * | 1/2021 | Deskevich | G06V 10/7747 |

FOREIGN PATENT DOCUMENTS

CN    110110754 A  *  8/2019  ........... G06K 9/6256

OTHER PUBLICATIONS

Cui, Yin, et al. "Class-balanced loss based on effective number of samples." Proceedings of the IEEE/CVF conference on computer vision and pattern recognition. 2019. (Year: 2019).*
Kukar, Matjaz, and Igor Kononenko. "Cost-sensitive learning with neural networks." ECAI. vol. 15. No. 27. 1998. (Year: 1998).*

* cited by examiner

*Primary Examiner* — Hal Schnee
(74) *Attorney, Agent, or Firm* — Paradice & Li LLP

(57) ABSTRACT

A method for controlling a bias of a neural network, the method may include training the neural network by using a loss function that is responsive to classes of a classification process and sensitivity input values thereby setting the bias.

18 Claims, 2 Drawing Sheets

POST-TRAINING CONTROL OF THE BIAS OF NEURAL NETWORKS

CROSS REFERENCE

This application claims priority from U.S. provisional patent 62/969,790 filing date Feb. 4, 2020, which is incorporated herein by reference.

BACKGROUND

Deep Neural Networks (DNN) are a popular algorithmic tool for dealing with classification tasks.

The purpose of a classification task is to assign an input to one class (or several classes) from a list of classes. An "unknown" class can be used to support unseen classes.
DNN Training A neural network has parameters (weights) that are adjusted during a training phase to best classify a set of input examples.

A bias may be used to fine tune the neural network.

The bias can be defined by the following equation, but not limited to this definition:

$$\text{Bias}[\hat{f}(x)] = E[\hat{f}(x)] - E[f(x)]$$

Where $f$ is the true classification function, $\hat{f}$ is the classification model, and E denotes mathematical expectation.

The bias of a model is a tendency of the model towards some of the classes at the expense of other classes. Changing the bias makes a model more sensitive to some classes and less sensitive to others.

Controlling the network bias after the network has been trained is hard.

There are attempts to treat the network output as class probability. In practice trained networks tend to be very confident or very unconfident in their decision, and balancing this requires careful parameter tuning, and doesn't always work.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
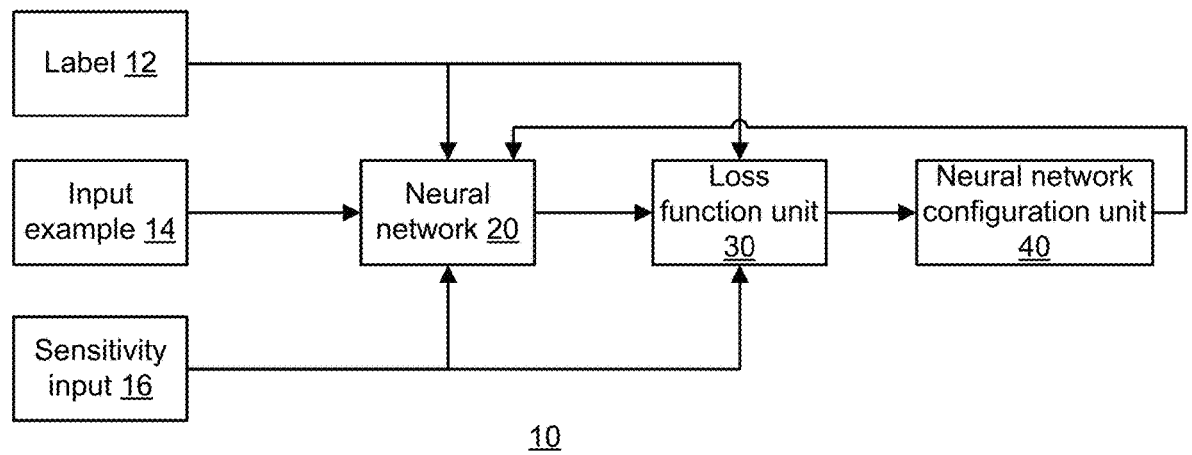
FIG. 1 illustrates a model training process according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using algorithms and/or neural networks known to those skilled in the art, details will not be explained in any greater extent than that considered necessary as illustrated above, for the understanding and appreciation of the underlying concepts of the present invention and in order not to obfuscate or distract from the teachings of the present invention.

According to an embodiment of the invention there are provided a devices, methods and non-transitory computer readable medium.

Any reference to a device should be applied, mutatis mutandis to a method that is executed by the device and/or to a non-transitory computer readable medium executable by the device.

Any reference to method should be applied, mutatis mutandis to a device that is configured to execute the method and/or to a non-transitory computer readable medium that stores instructions that once executed by the device will cause the device to execute the method.

Any reference to a non-transitory computer readable medium should be applied, mutatis mutandis to a method that is executed by a device and/or a device that is configured to execute the instructions stored in the non-transitory computer readable medium.

The term "and/or" is additionally or alternatively.

There is provided a method, a device and a computer readable medium for controlling the network bias even after the network has been trained.

There is provided a sensitivity input that affects the bias towards one of the classes. This allows controlling the network sensitivity in real-time with no need of retraining. A loss function that is calculated during the training process is altered by the sensitivity input creating the bias. This way the model learns to be biased according to the sensitivity input. For example, during training when the sensitivity is high the model is not penalized for mistakes in examples from one class, which makes it learn to be biased to the other class(es). During inference, if the provided sensitivity input is high, the model reaction will be this learned bias.

This includes the case of binary classification, which deals with only two classes, e.g. ON/OFF or "Detected"/ "Not Detected".

During training this sensitivity input receives a randomly generated number. This number is different for every data example (or a batch of examples), and it alters the loss function for this example. This number may be regenerated every training epoch. The generation and regeneration of the number may be performed in any manner—especially to provide different combinations of input examples and sensitivity input values.

The bias may be controlled by applying a class dependent weight for the training loss function.

This way the network learns that some classes are more important than others.

The loss function may be of the following form: $L_w(\hat{f}(x), l, s) = L(\hat{f}(x), l) * w(s, l)$ Here $L_w$ is a weighted variant of some loss function L (e.g. cross entropy, mean square error, etc.), s is the sensitivity input, w is a weight function, x is the input example, l is the label, and * denotes multiplication.

The label may be a class identifier. Classes may be, for example, any classes of objects—for example vehicle, pedestrians, animals, certain models of vehicles, certain colored vehicle, children, adults, and the like.

FIG. 1 illustrates a training system 10 that includes a neural network 20, a label input 12 (for providing labels of the input provided to the neural network during the training period), an input (for providing the input 14 to be processed by the neural network), a sensitivity input 16, a loss function unit 30 and a neural network configuration unit 40 such as an optimization unit. The optimization unit may calculate gradients, like in the case of all the gradient-descent based optimization methods—but this is not necessarily so, this applies also to other optimization methods like genetic algorithms, etc. The gradient provides a feedback to the neural network. Other feedback loops may be provided. The optimization unit or any other unit that may respond to the values of the loss function may apply any policy or algorithm to reach a desired tuning of the neural network.

The label is fed to the neural network and the loss function calculator, the sensitivity is fed to the neural network and the loss function unit, the output of the neural network is also fed to the loss function calculator.

The larger the weight (which is a function of the sensitivity input), the higher the loss for a mistake, and it will be more likely that the network will classify this example correctly.

Figure 2:
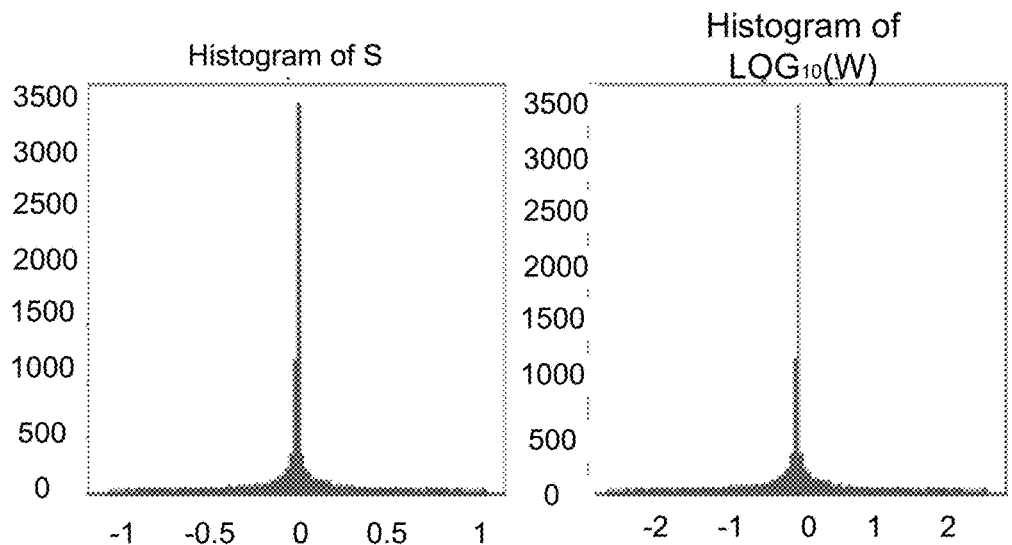
FIG. 2 illustrates two functions according to an embodiment of the invention.

FIG. 2 illustrates an example of sensitivity input distributions 61 and 62 with the corresponding weight function that is $$w(s) = \begin{cases} e^{6s}, & l=1 \\ 1/e^{6s}, & l=0 \end{cases}, s = u^5, u \sim U[-1, 1]$$

For multi-class applications, one sensitivity input may be added per class, controlling the loss for that class.

$L_w(\hat{f}(x), l, s_1, s_2, \ldots, s_C) = L(\hat{f}(x), l) * w(s_l)$ here C is the number of classes, and the label $l \in \{1, 2, \ldots, C\}$.

In this case the weight function can be just $w(s_l) = e^{6s_l}$. Other weight functions can be used.

Figure 3:
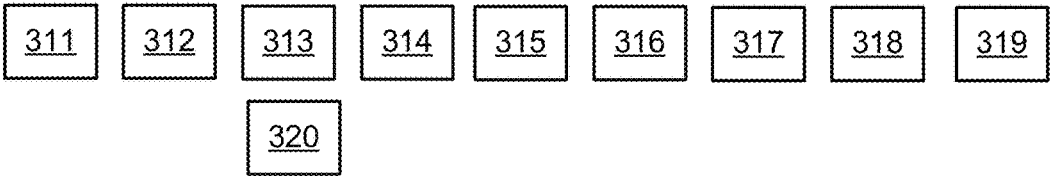
FIG. 3 is an example of a method.

FIG. 3 illustrates method 300 for controlling a bias of a neural network.

Method 300 may include step 310 of training the neural network by using a loss function that is responsive to classes of a classification process and sensitivity input values thereby setting the bias.

Step 310 may include steps 311, 312, 313, 314, 315, 316, 318, and 319.

Step 311 may include feeding input examples to the neural network.

Step 312 may include feeding labels indicative of one or more classes associated with each of the input examples to the neural network and to a loss function calculator.

Step 313 may include feeding the neural network and the loss function calculator with sensitivity inputs. The value of each sensitivity input (a number) may be determined in any manner.

Step 314 may include generating neural network outputs.

Step 315 may include feeding the neural network outputs to the loss function calculator.

Step 316 may include generating outputs of the loss function calculator.

Step 317 may include feeding the outputs of the loss function calculator to a neural network configuration unit.

Step 318 may include calculating one or more weights of the neural network by the neural network configuration unit.

Step 319 may include configuring the neural network by the neural network configuration unit.

Multiple repetitions of steps 311-319 may be provided until a stop condition is obtained. The stop condition may be reaching a predefined number of iterations, converging, or a combination thereof.

During different iterations of steps 311-319 different values of the sensitivity input may be provided.

The method may include step 320 of determining values of the sensitivity inputs in a random manner.

Step 320 may be repeated per each input example fed during step 311, or per each multiple input examples.

The neural network configuration unit may be an optimization unit.

The loss function may be a weighted variant of another loss function.

Step 316 may include calculating a weight that is class-dependent and sensitivity input value dependent. The weight may equals a first value for a first class and equals a second value for a second class, wherein the second value may be a reciprocal of the first value. More than two values may be defined to more than two classes.

For example—the weight may be $e^{6s}$ for a first class and $e^{-6s}$ for a second class, wherein s equals $u^5$, whereas u ranges between one and minus one.

Step 310 may be followed by step 330 of performing inference using the neural network; wherein the performing of the inference comprises providing inputs, labels and sensitivity inputs to the neural network.

The terms "including", "comprising", "having", "consisting" and "consisting essentially of" may replace each other while bearing in mind the differences between the terms.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Note that the device may be agnostic to the implementation of the training and/or inference, which may be performed by any combination of hardware and software, distributed or unified. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for controlling a bias of a neural network, the method comprising:
   training a neural network using a loss function that is responsive to a plurality of classes of a classification process so that a sensitivity input value(s) sets the bias of the neural network towards one of the plurality of classes, the training of the neural network including:
      calculating a class-dependent weight associated with the loss function for each of the plurality of classes based on an exponential function of the sensitivity input value s.

2. The method of claim 1, wherein the training of the neural network comprises:
   feeding input examples to the neural network;
   feeding, to the neural network and a loss function calculator, labels indicative of the plurality of classes and associated with the input examples;
   feeding the neural network and the loss function calculator with sensitivity inputs;
   generating neural network outputs;
   feeding the neural network outputs to the loss function calculator;
   generating outputs of the loss function calculator;
   feeding the outputs of the loss function calculator to a neural network configuration unit;
   calculating one or more weights of the neural network by the neural network configuration unit; and
   configuring the neural network by the neural network configuration unit.

3. The method of claim 2, further comprising:
   generating a random sensitivity input value for each of the input examples.

4. The method of claim 3, further comprising:
   re-calculating the sensitivity input value for each of the input examples.

5. The method of claim 3, wherein the neural network configuration unit is an optimization unit.

6. The method of claim 1, wherein the loss function is a weighted variant of another loss function.

7. The method of claim 1, wherein the class-dependent weight equals a first value for a first class of the plurality of classes and equals a second value for a second class of the plurality of classes, wherein the second value is a reciprocal of the first value.

8. The method of claim 1, wherein the exponential function equals $e^{6s}$ for a first class of the plurality of classes and equals $e^{-6s}$ for a second class of the plurality of classes, wherein s is a function of a random variable (u), wherein s equals $u^5$, and wherein u ranges from −1 to 1.

9. The method of claim 1, further comprising:
   performing an inference using the trained neural network.

10. A non-transitory computer readable medium storing instructions that, when executed by a computing system for controlling a bias of a neural network, cause the computing system to perform operations including:
    training a neural network using a loss function that is responsive to a plurality of classes of a classification process so that a sensitivity input value(s) sets the bias of the neural network towards one of the plurality of classes, the training of the neural network including:
       calculating a class-dependent weight associated with the loss function for each of the plurality of classes based on an exponential function of the sensitivity input value s.

11. The non-transitory computer readable medium of claim 10, wherein training of the neural network comprises:
    feeding input examples to the neural network;
    feeding, to the neural network and a loss function calculator, labels indicative of the plurality of classes and associated with the input examples;
    feeding the neural network and the loss function calculator with sensitivity inputs;
    generating neural network outputs;
    feeding the neural network outputs to the loss function calculator;
    generating outputs of the loss function calculator;
    feeding the outputs of the loss function calculator to a neural network configuration unit;
    calculating one or more weights of the neural network by the neural network configuration unit; and
    configuring the neural network by the neural network configuration unit.

12. The non-transitory computer readable medium of claim 11, wherein execution of the instructions causes the computing system to perform operations further including:
    generating a random sensitivity input value for each of the input examples.

13. The non-transitory computer readable medium of claim 12, wherein execution of the instructions causes the computing system to perform operations further including:
    re-calculating the sensitivity input value for each of the input examples.

14. The non-transitory computer readable medium of claim 12, wherein the neural network configuration unit is an optimization unit.

15. The non-transitory computer readable medium of claim 10, wherein the loss function is a weighted variant of another loss function.

16. The non-transitory computer readable medium of claim 10, wherein the class-dependent weight equals a first value for a first class of the plurality of classes and equals a second value for a second class of the plurality of classes, wherein the second value may be a reciprocal of the first value.

17. The non-transitory computer readable medium of claim 10, wherein the exponential function equals $e^{6s}$ for a first class of the plurality of classes and equals $e^{-6s}$ for a second class of the plurality of classes, wherein s is a function of a random variable (u), wherein s equals $u^5$, and wherein u ranges from −1 to 1.

18. The non-transitory computer readable medium of claim 10 wherein execution of the instructions causes the computing system to perform operations further including:
    performing an inference using the trained neural network.

\* \* \* \* \*